United States Patent
Cannell-Smith (10) Patent No.: US 9,751,650 B2
(45) Date of Patent: Sep. 5, 2017

(54) APPARATUS AND METHOD RELATING TO FLOW WRAPPING

(71) Applicant: Vancebuild Limited, Norwich, Norfolk (GB)

(72) Inventor: Anthony John Cannell-Smith, Norwich (GB)

(73) Assignee: Vancebuild Limited, Norwich, Norfolk (GB)

( * ) Notice: Subject to any disclaimer, the term of this patent is extended or adjusted under 35 U.S.C. 154(b) by 0 days.

(21) Appl. No.: 15/008,221

(22) Filed: Jan. 27, 2016

(65) Prior Publication Data

US 2016/0214749 A1 Jul. 28, 2016

(30) Foreign Application Priority Data

Jan. 28, 2015 (GB) .................................. 1501422.8

(51) Int. Cl.
| | |
|---|---|
| B65G 47/26 | (2006.01) |
| B65B 35/44 | (2006.01) |
| B65B 35/58 | (2006.01) |
| B65G 47/252 | (2006.01) |
| B65G 47/08 | (2006.01) |

(52) U.S. Cl.
CPC .............. *B65B 35/44* (2013.01); *B65B 35/58* (2013.01); *B65G 47/082* (2013.01); *B65G 47/252* (2013.01)

(58) Field of Classification Search
CPC .... B65G 47/082; B65G 47/084; B65B 35/44; B65B 35/50; B65H 29/6618; B65H 33/16

USPC ............. 414/794.4, 793.5, 792.9; 198/418.7, 198/419.3, 431, 430

See application file for complete search history.

(56) References Cited

U.S. PATENT DOCUMENTS

| | | | | |
|---|---|---|---|---|
| 5,044,876 | A * | 9/1991 | Stohlquist | ............ B65G 47/082 198/419.3 |
| 6,182,814 | B1 * | 2/2001 | Koehler | .................. B65B 23/14 198/418.7 |
| 6,199,680 | B1 * | 3/2001 | Sakai | ...................... B65B 35/58 198/419.2 |
| 2003/0057058 | A1 * | 3/2003 | Iwasa | ...................... B65B 5/064 198/419.3 |

(Continued)

FOREIGN PATENT DOCUMENTS

| | | |
|---|---|---|
| DE | 42 23 587 A1 | 1/1994 |
| DE | 10 2012 210 329 A1 | 12/2013 |

(Continued)

*Primary Examiner* — James R Bidwell
(74) *Attorney, Agent, or Firm* — Workman Nydegger (57) ABSTRACT

A flow wrapping apparatus displaces a number of packs from a first location where the packs are self-standing on their lower region to a second location where the packs are on edge to form a substantially horizontal stack. The apparatus includes first and second conveyors with a number of individually displaceable hands. The hands of the first conveyor displace packs from a first location where the packs are self-standing on their lower region to a second location where the packs are on edge. At least one of the hands of the second conveyor cooperates with at least one of the hands of the first conveyor to hold packs on their edge to form a substantially horizontal stack. A pair of individually displaceable hands of the second conveyor displace the stack towards a flow wrapping station.

23 Claims, 5 Drawing Sheets

(56) References Cited

U.S. PATENT DOCUMENTS

| | | | |
|---|---|---|---|
| 2003/0136641 A1* | 7/2003 | Iwasa | B65B 5/061 198/419.3 |
| 2004/0195074 A1* | 10/2004 | Iwasa | B65B 5/061 198/431 |
| 2007/0256909 A1 | 11/2007 | Shimomae et al. | |
| 2009/0308024 A1 | 12/2009 | Yokota et al. | |
| 2010/0205913 A1 | 8/2010 | Iwasa et al. | |
| 2015/0136564 A1 | 5/2015 | Hurni et al. | |
| 2015/0217886 A1 | 8/2015 | Blanz et al. | |

FOREIGN PATENT DOCUMENTS

| | | |
|---|---|---|
| EP | 2 364 916 A1 | 9/2011 |
| FR | 2 519 951 A1 | 7/1983 |
| GB | 2 098 953 A1 | 12/1982 |
| GB | 2 512 135 A | 9/2014 |
| WO | 2014/012913 A1 | 1/2014 |

* cited by examiner

FIG. 3

APPARATUS AND METHOD RELATING TO FLOW WRAPPING

CROSS-REFERENCE TO RELATED APPLICATIONS

This application claims priority to United Kingdom Application No. GB 1501422.8, filed Jan. 28, 2015, which is incorporated herein by specific reference.

FIELD OF THE INVENTION

The invention relates to an apparatus and a method of presenting a number of packs for flow wrapping.

BACKGROUND TO THE INVENTION

The packs with which preferred embodiments of the invention are concerned present a lower and an upper region separated by an edge region. These packs are typically for crisps, chips or other such convenience foods which are sold in both individual portions and multi-pack packaging. These kinds of packs are often provided with inherently flexible walls. For such inherently instable packs to stand on their edge and to remain standing on edge considerable difficulties arise.

Individual packs of this kind tend to rest in conventional conveyors on either their upper or lower regions which tend to be wider and longer than their edge regions. Known prior art flow wrapping machinery achieves rapid and reliable multi-packs containing these kinds of packs. However, due to the geometry of the individual packs and their potentially variable contents, multi-packs containing these tend to be oversized which results in considerable material waste and often excessive and undesirable allowances for space in transport and on the supermarket's shelves. Any reduction in material usage and improvement in the configuration of the multi-packs would be significant, particularly bearing in mind the enormous quantities of multi-packs being produced, shipped and stored throughout the world.

SUMMARY OF THE INVENTION

In a first broad independent aspect, the invention provides an apparatus for presenting a number of packs for flow wrapping; where each pack has a lower region, an upper region and an edge region; said edge region being provided between said lower and upper regions; said apparatus displacing a number of packs from a first location where the packs are self-standing on their lower region to a second location where the packs are on edge to form a substantially horizontal stack; wherein said apparatus comprises a first conveyor and a second conveyor; both of said conveyors having a number of individually displaceable hands; wherein the hands of said first conveyor displace packs from a first location where the packs are self-standing on their lower region to a second location where the packs are on edge; and at least one of said hands of said second conveyor cooperates with at least one of said hands of said first conveyor to hold packs on their edge to form a substantially horizontal stack; and a pair of individually displaceable hands of said second conveyor being configured to hold at the forward and rearward most portions of said formed substantially horizontal stack and displace said stack towards a flow wrapping station.

This configuration is particularly advantageous because by presenting a horizontal stack to the flow wrapper, the flow wrapper is able to cover the stack of packs tightly with packaging material. This considerably reduces generated waste material. Furthermore, it also reduces the overall volume of the packs which is particularly beneficial for transportation and for display on the supermarket shelves. It also improves the efficiency of the wrapping process since it allows for the potential linear transport of such packs to the wrapper.

In a subsidiary aspect, the apparatus further comprises one or more endless conveyors with a number of individually displaceable hands; wherein the substantially horizontal stacks are held by a pair of cooperating individually displaceable hands at the forward and rearward most positions of the substantially horizontal stacks. By providing individually displaceable hands, the stacking process may be optimised to respond to a particular flow rate of produce along the pathway. It also allows for advantageous on edge collation of, in certain embodiments, a plurality of stacks. Thus it can facilitate advantageously responsive queueing of the horizontal stacks prior to wrapping. Furthermore, in certain embodiments, providing individually displaceable hands also allows the apparatus to respond to potential changes in the width or other such dimensions of the packs.

In a subsidiary aspect, the packs are displaced along a pathway; at least one conveyor being provided on a first side of the pathway and another conveyor being provided on a second side of the pathway. This configuration is particularly advantageous since it may allow ready access to the packs from an upper or lower position. This may, for example, facilitate further handling.

In a further subsidiary aspect, the packs are displaced along a pathway; at least one lower conveyor being located underneath the pathway and at least one upper conveyor being located above the pathway. This allows advantageous access from the side of the apparatus whilst providing advantageous handling and minimal action for the displacement of the packs from an originally horizontal position to a substantially vertical position in order to form a substantially horizontal stack.

In a further subsidiary aspect, the lower conveyor is provided immediately before the upper conveyor; the horizontal stacks being passed from the lower conveyor to the upper conveyor with at least one hand from the upper conveyor cooperating with a hand from the lower conveyor. This configuration achieves particularly efficient lifting and orientation of the packs in order to form substantially horizontal stacks.

In a further subsidiary aspect, the upper conveyor is provided above a further lower conveyor on which the substantially horizontal stack is carried prior to entry into a flow wrapper. This configuration is particularly advantageous in order to improve the potential queueing of completed substantially horizontal stacks prior to entering the wrapping station of the apparatus.

In a further subsidiary aspect, the lower conveyor is located underneath a pathway and comprises individually displaceable hands. The individually displaceable hands are preferably L-shaped. The hands function in effect as a pocket or scoop for receiving one or more horizontal packs and by appropriately facilitating the rotation of the L-shaped hands bringing the succession of packs together to form a substantially horizontal stack.

In a further subsidiary aspect, the L-shaped hands incorporate an upper portion and a lower portion; the upper portion being in a substantially upright position when employed for holding a substantially horizontal stack of packs; the lower portion extending substantially perpendicular to the upper portion. The upper and lower portion collaborating for holding the substantially horizontal stack at least at the rear of the stack. This configuration illustrates a further gain in efficiency by allowing the L-shaped displaceable hands to fulfil the double function of a collection of initially horizontal packs and the securing of one end of the substantially horizontal stack.

In a subsidiary aspect, the upper portion incorporates at least two finger portions separated by a gap. This configuration is particularly advantageous since it allows an end of the stack to be sequentially held by the L-shaped hand and the hand of another conveyor.

In a subsidiary aspect, the conveyor is located above the pathway and comprises a plurality of individually displaceable hands. This configuration allows the or a succession of substantially horizontal stacks to be presented one by one into the wrapper.

In a subsidiary aspect, the individually displaceable hands of the upper conveyor incorporate one or more fingers which are shaped and configured to pass, in use, through the gap between the fingers of the hands of the lower conveyor. This allows for advantageous smooth transition from the lower conveyor to the upper conveyor.

In a further subsidiary aspect, the apparatus further comprises means for varying the distance between hands dependent upon a pre-determined number or the property of packs in a stack. This is particularly advantageous in terms of coping with potential changes in shape and configuration of packs. It also allows the apparatus to adapt to a particular number of packs for a given run of multi-packs.

In a subsidiary aspect, the apparatus further comprises means for displacing the hands only when a pre-determined number of packs have been stacked. This allows the apparatus to respond in changes to the quantity and frequency of the supply of packs.

In a further broad independent aspect, the invention provides a method of presenting a number of packs for flow wrapping; where each pack has a lower region, an upper region and an edge region; said edge region being provided between said lower and upper regions, the method comprising the steps of:
  providing a first conveyor and a second conveyor; both of which having a number of individually displaceable hands;
  displacing the hands of a first conveyor from a first location where the packs are self-standing on their lower region to a second location where the packs are on edge;
  holding packs on their edge by cooperation of at least one hand of said first conveyor with at least one hand of said second conveyor to form a substantially horizontal stack;
  displacing a pair of hands of said second conveyor to hold said formed substantially horizontal stack at the forward and rearward most portions of said substantially horizontal stack; and
  presenting said substantially horizontal stack to a flow wrapping station.

This method is particularly advantageous in terms of potential reduction of the packaging employed for the production of multi-packs since it allows for much more compact packing. It will also reduce the volume taken up in transportation and on supermarket shelves.

In a subsidiary aspect, the method comprises the steps of providing one or more endless conveyors with a number of individually displaceable hands; and holding the substantially horizontal stacks by a pair of cooperating individually displaceable hands at the forward and rearward most portions of the substantially horizontal stacks. This configuration is particularly advantageous in terms of managing the flow of stacks to the wrapper. In particular, it facilitates a varied response to variations in the supply of packs.

In a subsidiary aspect, the method further comprises the step of displacing the packs along a pathway with at least one conveyor being provided on a first side of the pathway and another conveyor being provided on a second side of the pathway.

In a further subsidiary aspect, the method comprises the step of displacing the packs along a pathway with at least one lower conveyor being located underneath the pathway and at least one upper conveyor being located above the pathway.

In a further subsidiary aspect, the method comprises the step of providing the lower conveyor immediately before the upper conveyor; the horizontal stacks being passed from the lower conveyor to the upper conveyor with at least one hand from the upper conveyor cooperating with a hand from the lower conveyor.

In a subsidiary aspect, the method further comprises the step of providing the upper conveyor above a further conveyor on which the substantially horizontal stack is carried prior to entry into a flow wrapper.

In a further subsidiary aspect, the method further comprises the steps of locating the lower conveyor underneath the pathway and providing individually displaceable hands which are L-shaped.

In a further subsidiary aspect, the method comprises the step of providing L-shaped hands with an upper portion and a lower portion; the upper portion being substantially upright in position when employed for holding a substantially horizontal stack of packs; the lower portion extending substantially perpendicular to the upper portion; the upper and lower portion collaborating for holding the substantially horizontal stack at least at the rear of the stack.

In a subsidiary aspect, the method proposes that the upper portion incorporates at least two finger portions separated by a gap.

In a subsidiary aspect, the method comprises the step of locating the conveyor above the pathway and providing a plurality of individually displaceable hands.

In a subsidiary aspect, the method further comprises the step of providing the individually displaceable hands of the upper conveyor with one or more fingers which are shaped and configured to pass, in use, through the gap between the fingers of the hands of the lower conveyor.

In a subsidiary aspect, the method further comprises the step of varying the distance between hands dependent upon a pre-determined number of packs in a stack.

In a further subsidiary aspect, the method further comprises the step of displacing the hands only when a pre-determined number of packs has been stacked.

DETAILED DESCRIPTION OF THE FIGURES

Figure 1:
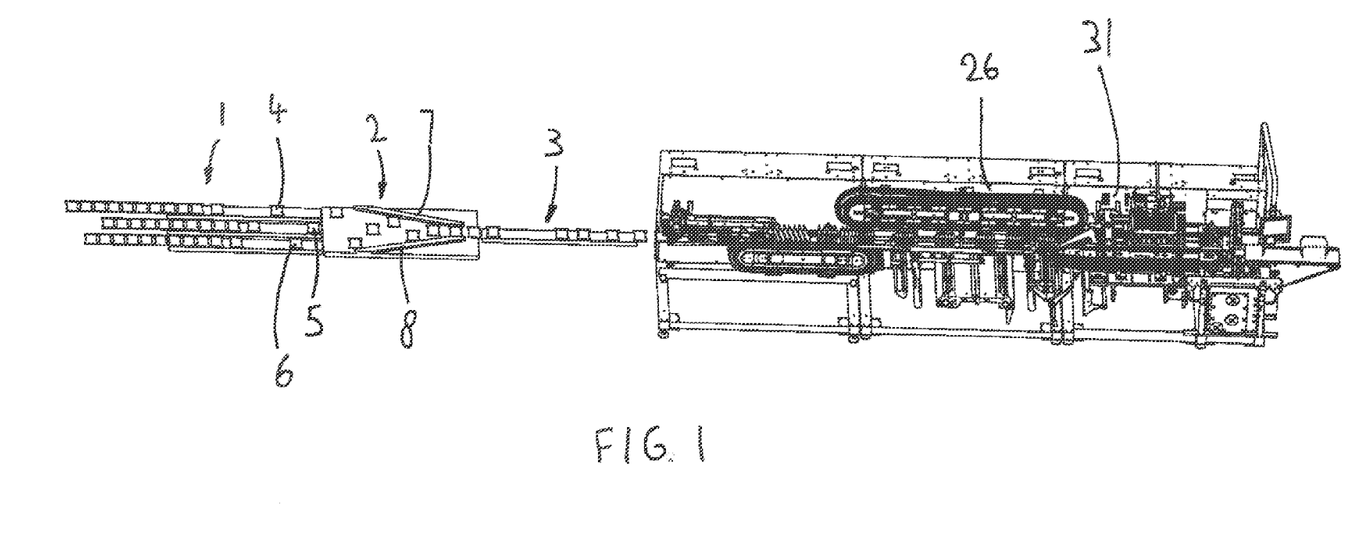
FIG. 1 shows a perspective view of an apparatus for presenting a number of packs for flow wrapping, together with a flow wrapper.

FIG. 1 shows the various stations of the wrapper from initial introduction of the packs to the multi-pack. A series of conveyors 1, 2 and 3 are provided initially. Conveyor 1 introduces three different kinds of packs, such as packs 4, 5 and 6. Conveyor 1 has three individual tracks leading to conveyor 2. As part of conveyor 2, guide rails 7 and 8 funnel the packs in order to present a succession of packs onto conveyor 3.

Figure 2:
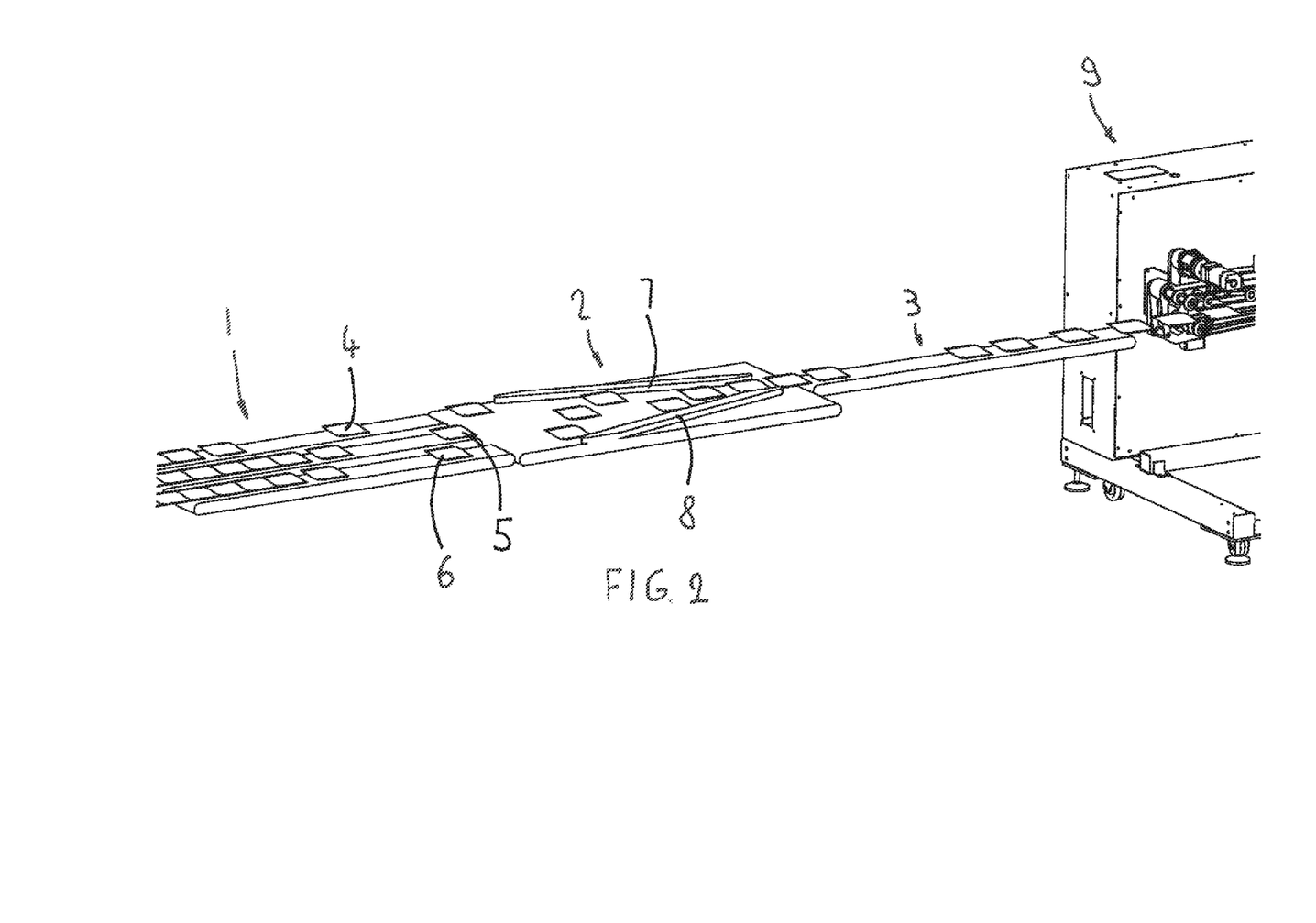
FIG. 2 shows a perspective view of the conveyors introducing a number of packs into the apparatus.

FIG. 2 shows the operations of conveyors 1, 2 and 3 in greater detail. Appropriate support means would be provided underneath the various conveyors. These are not shown for clarity. A unit combining preparation and wrapping is generally referenced 9.

After a succession of appropriate conveyors, the packs such as pack 10 reach an endless conveyor 11 which is provided underneath the pathway of the packs. Endless conveyor 11 is substantially oblong in shape and allows movers such as hand 12 to be displaced along an elliptical rail 13. The elliptical rail incorporates two straight sides 14 and 15 and two end curves 16 and 17. The movers or hands such as hand 12 may displace in time independently from any of the other hands such as hand 19. A track 20 drives the motion of the hands about the endless conveyor so that it can adopt an infinite number of positions. The track 20 may be a linear motor which selectively generates magnetic forces which interact with plates provided as part of the mover in order to cause the mover to displace. The mover may incorporate a number of guide wheels or bearing surfaces which are provided to interact with the elliptical rail. The movers may therefore incorporate a mounting portion which engages the rail and plates which react with the linear motor to drive the displacement.

Hand 12 and any one of the other hands such as hand 19 of said first conveyor are L-shaped in side view and incorporate an upper portion and a lower portion respectively referenced 21 and 22. It also incorporates a gap 23 between two finger portions of the hand. In a preferred embodiment as best seen when viewing hand 19, there are provided two gap portions 24 and 25. At the base of the hand, the hand is mounted onto the rail of the endless conveyor by a mounting portion. In addition, the hand is configured to pivot about an axis 18 which extends along the width of the hand and which is situated in lower most portion of the hand. This provision allows the hand to maintain a relatively upright position as it displaces away from the package as it goes down the end curve 17. A cam mechanism or other such mechanism may be provided to switch the hand between a position where it is allowed to pivot and one where it must hold its configuration. When referring to hand 32 which is shown in outline behind pack 10, it can be seen that it has started to rotate in order to scoop up pack 10 thereby changing its orientation from substantially horizontal to vertical (or in other words on edge). A sufficient number of hands may be provided to allow the so called horizontal stack to be formed incrementally. In certain embodiments, the hands may be employed to collect a single pack at a time whilst in other embodiments the hands may be configured to collect and change the orientation of a plurality of packs. Once a number of packs have been collated, the L-shaped hand has fulfilled its primary function and can pass over the function of holding individual packs in the vertical direction to the hands of the upper endless conveyor 26.

Figure 3:
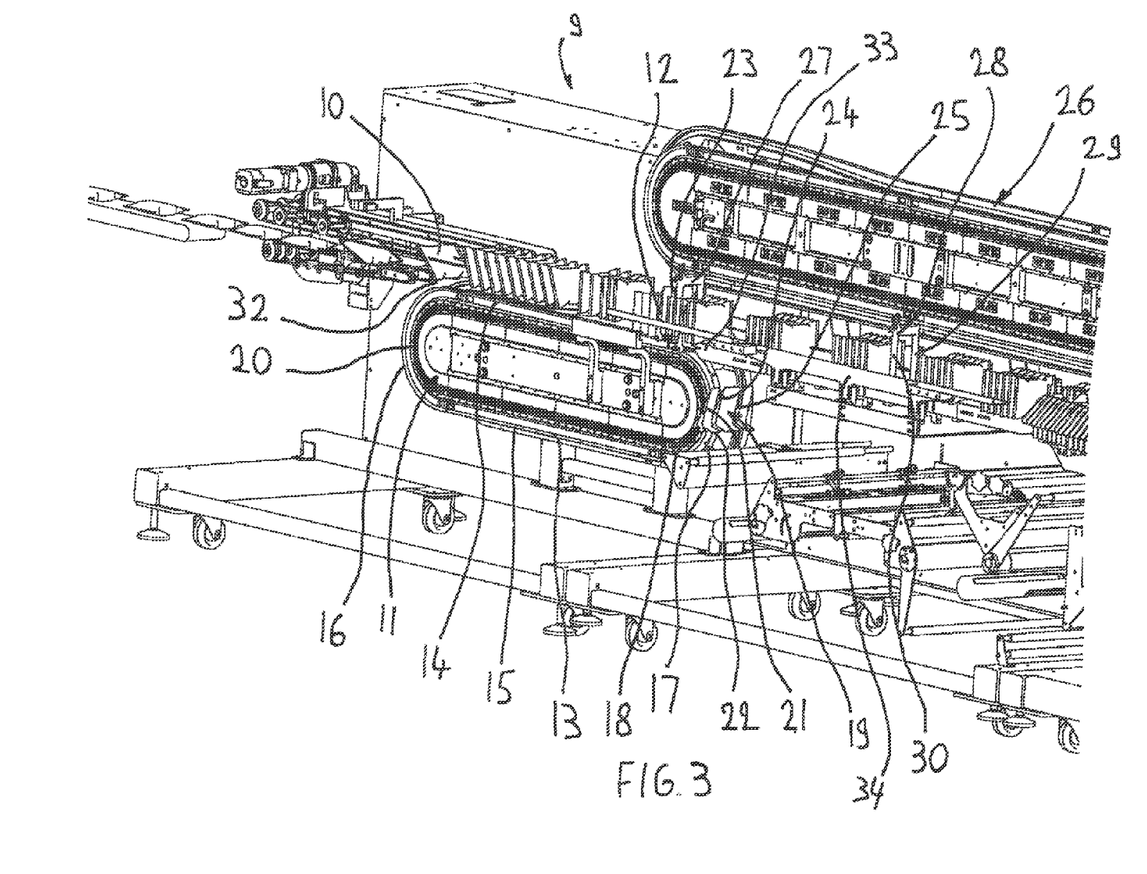
FIG. 3 shows a perspective view of the lower and upper endless conveyors.
Figure 4:
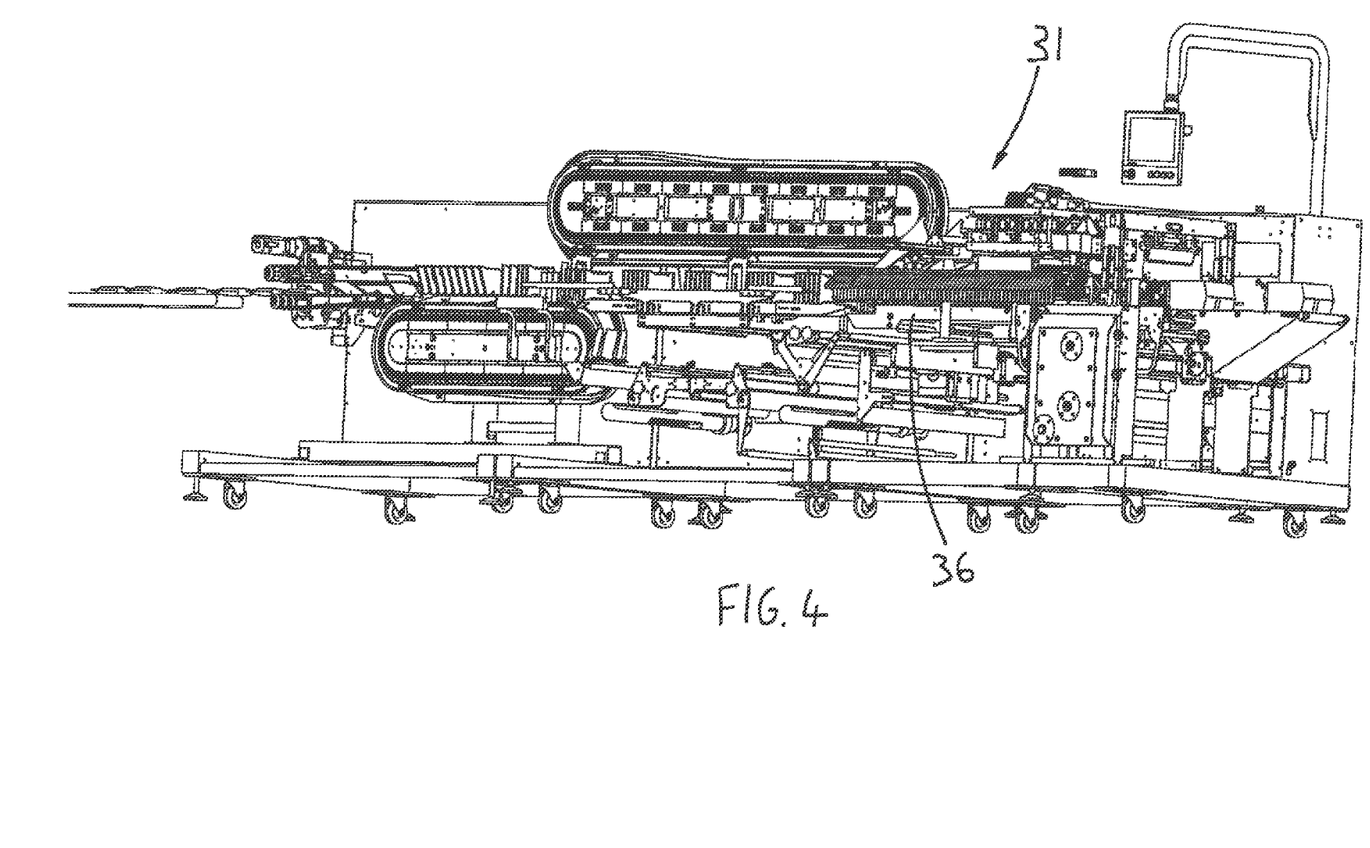
FIG. 4 shows a perspective view of the lower and upper endless conveyors and the wrapping station of the apparatus.

Upper conveyor 26 may be of a similar configuration as the lower conveyor 11. In a preferred embodiment, it employs a plurality of individually displaceable hands such as hands 27 and 28 which instead of being of the L-shaped configuration, may possess two tines 29 and 30 which are shaped and configured to pass through the gaps 24 and 25 located in the hands of the lower endless conveyor. This allows the hands of the upper endless conveyor to hold both the forward most portion of a substantially horizontal stack of vertically disposed packs and the rearward most portion of the substantially horizontal stack. The hands such as hand 28 of the upper endless conveyor may also be supported on a mover which is secured onto a rail. The rail is formed by a succession of lower portion, forward most curved portion, upper portion and rearward most curved portion. A track is provided to drive the position of the hands on the rail into any appropriate position. Pairs of hands may be programmed to secure a pre-determined number of packs. Appropriate measurement means may also be provided to assess the individual width of packs in order to appropriately space the hands. Underneath the substantially horizontal stacks, a further conveyor may be provided to assist in carrying the stack in the configuration shown in the figure whilst the hands of the upper endless conveyor may be provided on either end of the substantially horizontal stack in order to prevent these from falling back into their natural positions. The size of the conveyor may be varied in order to allow the queueing of multiple horizontal stacks so that the flow wrapper may operate at a substantially continuous speed irrespective of potential fluctuations in the supply line to the endless conveyors. The further conveyor may take the form of one or more rails 33 which support the underside of the horizontal stack of packs. In this potential embodiment, the further conveyor would therefore be passive whilst the displacement of the stack would be achieved solely by the hands of the upper conveyor which maintain the pack in the vertical direction by holding the first and last packs respectively. Side plates may be provided on one or both sides of the rails in order to further assist in maintaining the horizontal stack as it is conveyed in the direction of the flow wrapper. FIGS. 3 and 4 show a succession of stacks held in a queue. For simplicity, whilst it is envisaged that a hand is provided at both ends of the individual horizontal stacks, only hand 28 has been shown.

FIG. 4 shows a flow wrapping station 31. During the wrapping process further fingers may be required to hold the substantially horizontal stack in position. As can be seen, the path followed by the packs and the stacks is in a substantially straight line in order to allow the improvements discussed above to be achieved.

Figure 5:
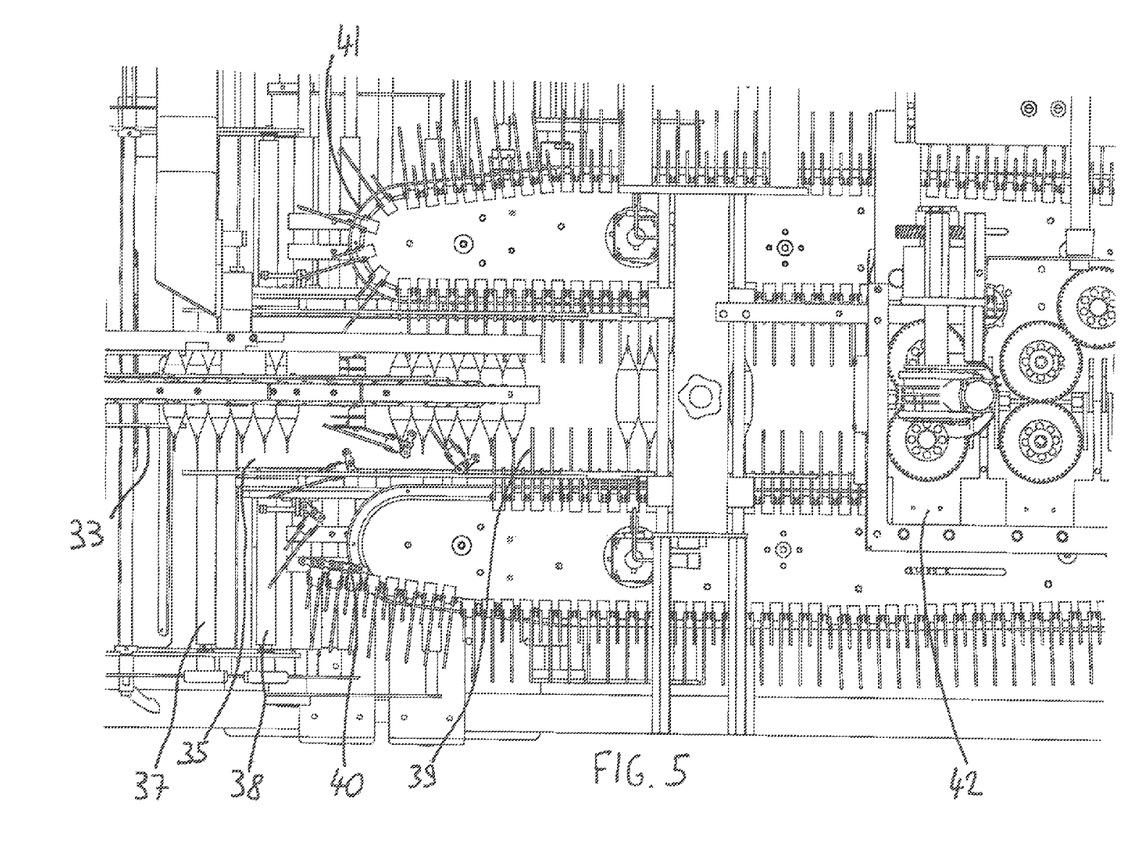
FIG. 5 shows a flow wrapper station 31 from an upper elevation.

FIG. 5 shows a flow wrapper station 31 from an upper elevation. Once the stacks arrive at the end of rails 33, the lower portion of the stacks are placed on top of the plastics sheet material 35, which is itself resting on appropriate conveying means, such as rail 36. The plastics sheet material or film is brought to the flow wrapping station via a plurality of rollers, such as rollers 37 and 38. These may be configured to ensure that the appropriate tension is maintained in the film and that the film is appropriately unwound prior to being wrapped around the horizontal stacks. This can be best seen in FIG. 1, the upper endless conveyor 26 overhangs towards its forward most extremity in the flow wrapping station. In this overhanging portion, the front holding hand, such as hand 21 of FIG. 3 passes on the responsibility of holding the front portion of the stack to tines, such as tine 39. On both sides of the flow wrapping station, an array of closely contiguous tines is provided for displacement on an endless conveyor. In this embodiment, the tines are secured to a chain 40, which may be driven by a motor around a track 41. The tines are configured to adopt at least two positions: an extended position as shown in FIG. 5 or a retracted position. Between individual stacks, the tines are extended whilst they would be retracted to accommodate the width of the stacks. The stacks can thus be wrapped as a horizontal stack. This configuration also allows the wrapping film to be provided between the horizontal stacks and the tines, so that these in effect bring the plastic film closer together when the tines are extended prior to the opposite lateral ends of the film being fed into a sealing station 42 located above the stack. Once the packs are sealed, the ends of the wrapped horizontal stacks are sealed and cut to fully enclose the wrapped produce.

The invention claimed is:

1. An apparatus for presenting a number of packs for flow wrapping, where each pack has a lower region, an upper region and an edge region, said edge region being provided between said lower and upper regions, said apparatus displacing a number of packs from a first location where the packs are self-standing on their lower region to a second location where the packs are on edge to form a substantially horizontal stack; said apparatus comprising:
   a first conveyor and a second conveyor, both of said conveyors having a number of individually displaceable hands;
   wherein said first conveyor is an endless conveyor incorporating a track along which each of said individually displaceable hands can be individually displaced, in use;
   wherein the hands of said first conveyor displace packs by scooping these up from beneath from a first location where the packs are self-standing on their lower region to a second location where the packs are on edge whilst being held by said hands of said first conveyor, and at least one of said hands of said second conveyor cooperates with at least one of said hands of said first conveyor to hold packs on their edge to form a substantially horizontal stack; and
   a pair of individually displaceable hands of said second conveyor is located above said horizontal stack; said pair of hands being configured to hold at the forward and rearward most portions of said formed substantially horizontal stack and displace said stack towards a flow wrapping station.

2. The apparatus according to claim 1, wherein said second conveyor is an endless conveyor.

3. The apparatus according to claim 1, wherein the packs are displaced along a pathway, said first conveyor being provided on a first side of the pathway and said second conveyor being provided on a second side of the pathway.

4. The apparatus according to claim 1, wherein the packs are displaced along a pathway, said first conveyor being located underneath said pathway and said second conveyor being located above said pathway.

5. The apparatus according to claim 4, wherein said first conveyor is provided immediately before said second conveyor.

6. The apparatus according to claim 4, wherein said second conveyor is provided above a further conveyor, the substantially horizontal stack being carried on said further conveyor prior to entry into a flow wrapper.

7. The apparatus according to claim 1, wherein said first conveyor comprises individually displaceable hands which are L-shaped.

8. The apparatus according to claim 7, wherein said L-shaped hands incorporate an upper portion and a lower portion, the upper portion being in a substantially upright position when employed for holding a substantially horizontal stack of packs, said lower portion extending substantially perpendicular to said upper portion, said upper and lower portion collaborating for holding the substantially horizontal stack at least at the rear of the stack.

9. The apparatus according to claim 8, wherein said upper portion incorporates at least two finger portions separated by a gap.

10. The apparatus according to claim 9, wherein the individually displaceable hands of said second conveyor incorporate one or more fingers which are shaped and configured to pass, in use, through the gap between the fingers of the hands of said first conveyor.

11. The apparatus according to claim 1, further comprising means for varying the distance between hands dependent upon a predetermined number or the property of packs in a stack.

12. The apparatus according to claim 1, further comprising means for displacing said hands only when a predetermined number of packs have been stacked.

13. A method of presenting a number of packs for flow wrapping, where each pack has a lower region, an upper region and an edge region, said edge region being provided between said lower and upper regions, the method comprising the steps of:
   providing a first conveyor and a second conveyor, both of which having a number of individually displaceable hands; said first conveyor being an endless conveyor incorporating a track along which each of said individually displaceable hands can be individually displaced, in use;
   scooping up the packs from beneath by displacing the hands of a first conveyor from a first location where the packs are self-standing on their lower region to a second location where the packs are on edge whilst being held by said hands of said first conveyor;
   holding packs on their edge by cooperation of at least one hand of said first conveyor with at least one hand of said second conveyor to form a substantially horizontal stack;
   displacing a pair of hands of said second conveyor which is located above said horizontal stack; said pair of hands being configured to hold said formed substantially horizontal stack at the forward and rearward most portions of said substantially horizontal stack; and
   presenting said substantially horizontal stack to a flow wrapping station.

14. The method according to claim 13, comprising the step of displacing said packs along a pathway with said first conveyor being provided on a first side of the pathway and said second conveyor being provided on a second side of the pathway.

15. The method according to claim 13, comprising the step of displacing said packs along a pathway with said first conveyor being located underneath said pathway and said second conveyor being located above said pathway.

16. The method according to claim 15, comprising the further step of providing said second conveyor above a further conveyor on which the substantially horizontal stack is carried prior to entry into a flow wrapper.

17. The method according to claim 13, further comprising the steps of providing individually displaceable hands which are L-shaped.

18. The method according to claim 17, comprising the step of providing L-shaped hands with an upper portion and a lower portion, the upper portion being in a substantially upright position when employed for holding a substantially horizontal stack of packs, said lower portion extending substantially perpendicular to said upper portion, said upper and lower portion collaborating for holding the substantially horizontal stack at least at the rear of the stack.

19. The method according to claim 18, comprising the step of providing said upper portion of said L-shaped hands with at least two finger portions separated by a gap.

20. The method according to claim 19, further comprising the step of providing the individually displaceable hands of said second conveyor with one or more fingers which are shaped and configured to pass, in use, through the gap between the fingers of the hands of said first conveyor.

21. The method according to claim 13, further comprising the step of varying the distance between hands dependent upon a predetermined number of packs in a stack.

22. The method according to claim 13, further comprising the step of displacing said hands only when a predetermined number of packs have been stacked.

23. The apparatus according to claim 1, wherein said individually displaceable hands can be individually displaced along said track so as to adjust spacing between said individually displaceable hands along a length of said track.

* * * * *